(12) United States Patent
Hayashi

(10) Patent No.: US 10,158,790 B2
(45) Date of Patent: Dec. 18, 2018

(54) IMAGE PROCESSING APPARATUS, IMAGE PROCESSING SYSTEM, AND IMAGE PROCESSING METHOD

(71) Applicant: Sony Semiconductor Solutions Corporation, Kanagawa (JP)

(72) Inventor: Masaaki Hayashi, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 15/554,926

(22) PCT Filed: Jan. 12, 2016

(86) PCT No.: PCT/JP2016/050641
§ 371 (c)(1),
(2) Date: Aug. 31, 2017

(87) PCT Pub. No.: WO2016/152190
PCT Pub. Date: Sep. 29, 2016

(65) Prior Publication Data
US 2018/0048789 A1 Feb. 15, 2018

(30) Foreign Application Priority Data

Mar. 20, 2015 (JP) ................................. 2015-057773

(51) Int. Cl.
*H04N 5/21* (2006.01)
*H04N 7/18* (2006.01)
(Continued)

(52) U.S. Cl.
CPC ................ *H04N 5/21* (2013.01); *G06T 5/50* (2013.01); *H04N 5/265* (2013.01); *H04N 5/272* (2013.01);
(Continued)

(58) Field of Classification Search
CPC ............ H04N 5/50; H04N 5/21; H04N 5/265; H04N 7/18; H04N 9/64; H04N 5/272;
(Continued)

(56) References Cited

U.S. PATENT DOCUMENTS 4,296,436 A * 10/1981 Achiha ................... H04N 5/21
348/620
2005/0122433 A1* 6/2005 Satou ....................... H04N 5/21
348/701
(Continued)

FOREIGN PATENT DOCUMENTS

JP 07-143448 A 6/1995
JP 2005-236472 A 9/2005
(Continued)

OTHER PUBLICATIONS

International Search Report and Written Opinion and English translation thereof dated Mar. 22, 2016 in connection with International Application No. PCT/JP2016/050641.
(Continued)

*Primary Examiner* — Michael Lee
(74) *Attorney, Agent, or Firm* — Wolf, Greenfield & Sacks, P.C.

(57) ABSTRACT

An image memory is reduced in an image processing apparatus that generates a background image from which the influence of rain or the like is removed.
In the image processing apparatus, a selection unit selects two image signals having a shorter distance in a color space from among an input image signal input during a focused processing cycle among processing cycles executed for respective time-series frames each constituted by the input image signal, an immediately preceding output image signal which is an output image signal generated during a processing cycle immediately preceding the focused processing cycle, and an already output image signal which is an image
(Continued)

signal based on the output image signal generated during a processing cycle preceding the focused processing cycle by two cycles. An output image signal generation unit generates the output image signal by mixing the two selected image signals on the basis of a predetermined mixing ratio.

9 Claims, 16 Drawing Sheets

(51) Int. Cl.
*G06T 5/50* (2006.01)
*H04N 5/265* (2006.01)
*H04N 9/64* (2006.01)
*H04N 5/272* (2006.01)
*H04N 9/67* (2006.01)
*H04N 5/222* (2006.01)
*H04N 5/232* (2006.01)

(52) U.S. Cl.
CPC ............... *H04N 7/18* (2013.01); *H04N 7/183* (2013.01); *H04N 9/64* (2013.01); *H04N 9/67* (2013.01); *H04N 5/2226* (2013.01); *H04N 5/23212* (2013.01); *H04N 5/23293* (2013.01)

(58) Field of Classification Search
CPC ........ H04N 7/183; H04N 9/67; H04N 5/2226; H04N 5/23212; H04N 5/23293
USPC ................................... 348/569, 659
See application file for complete search history.

(56) References Cited

U.S. PATENT DOCUMENTS

| | | | |
|---|---|---|---|
| 2006/0170769 A1* | 8/2006 | Zhou ................... | G06K 9/00362 348/143 |
| 2006/0227220 A1* | 10/2006 | Kondo ....................... | G06T 5/50 348/208.1 |
| 2008/0158428 A1* | 7/2008 | Ishii ......................... | H04N 9/77 348/663 |
| 2009/0027519 A1* | 1/2009 | Nishiwaki ............... | G06T 5/002 348/241 |
| 2010/0141806 A1 | 6/2010 | Uemura et al. | |
| 2010/0238354 A1* | 9/2010 | Shmueli ................... | G06T 5/002 348/607 |
| 2017/0148148 A1* | 5/2017 | Okuyama ................. | G06T 7/20 |

FOREIGN PATENT DOCUMENTS

| | | |
|---|---|---|
| JP | 2006-018658 A | 1/2006 |
| JP | 2010-141663 A | 6/2010 |
| WO | WO 2008/111549 A1 | 9/2008 |

OTHER PUBLICATIONS

International Preliminary Report on Patentability and English translation thereof dated Oct. 5, 2017 in connection with International Application No. PCT/JP2016/050641.

* cited by examiner

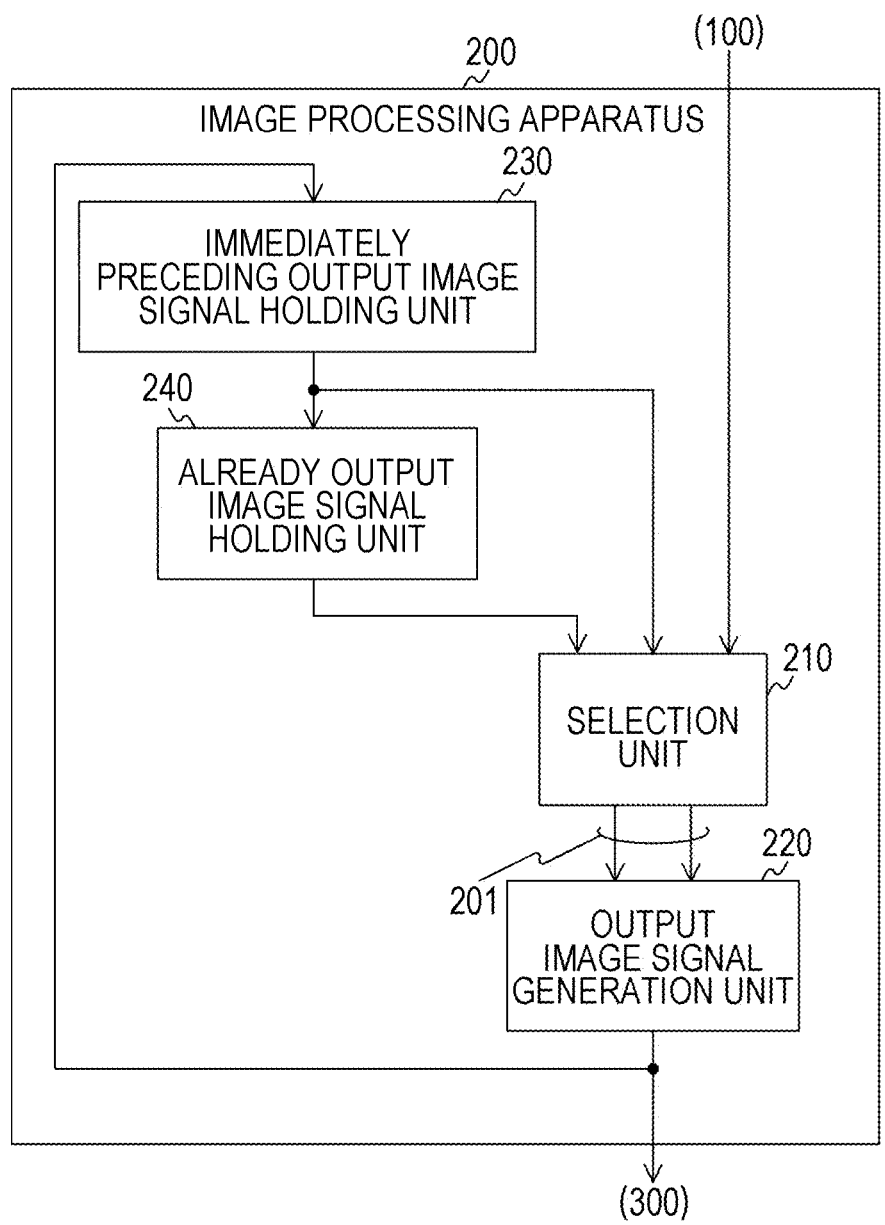

FIG. 3

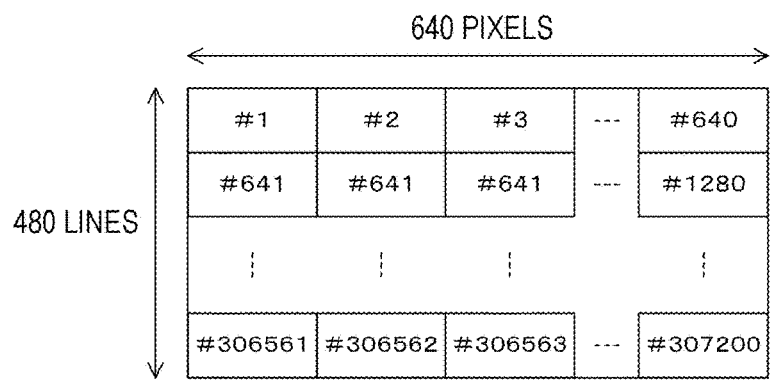

a

| ADDRESS | #1 | #2 | #3 | --- | #307200 |
|---|---|---|---|---|---|
| IMMEDIATELY PRECEDING OUTPUT IMAGE SIGNAL | IMMEDIATELY PRECEDING OUTPUT IMAGE SIGNAL #1 | IMMEDIATELY PRECEDING OUTPUT IMAGE SIGNAL #2 | IMMEDIATELY PRECEDING OUTPUT IMAGE SIGNAL #3 | --- | IMMEDIATELY PRECEDING OUTPUT IMAGE SIGNAL #307200 | b

| ADDRESS | #1 | #2 | #3 | --- | #307200 |
|---|---|---|---|---|---|
| ALREADY OUTPUT IMAGE SIGNAL | ALREADY OUTPUT IMAGE SIGNAL #1 | ALREADY OUTPUT IMAGE SIGNAL #2 | ALREADY OUTPUT IMAGE SIGNAL #3 | --- | ALREADY OUTPUT IMAGE SIGNAL #307200 | c

FIG. 8
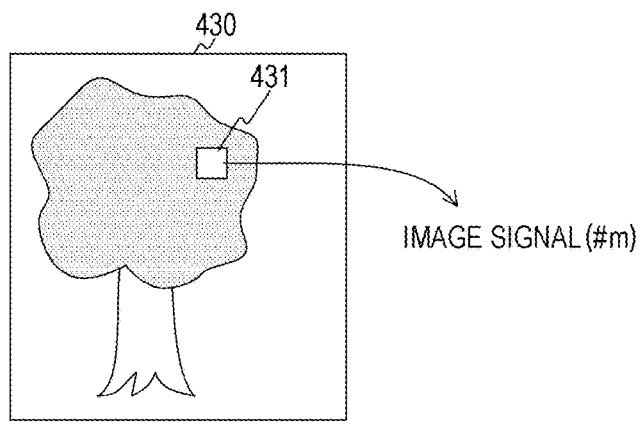
a
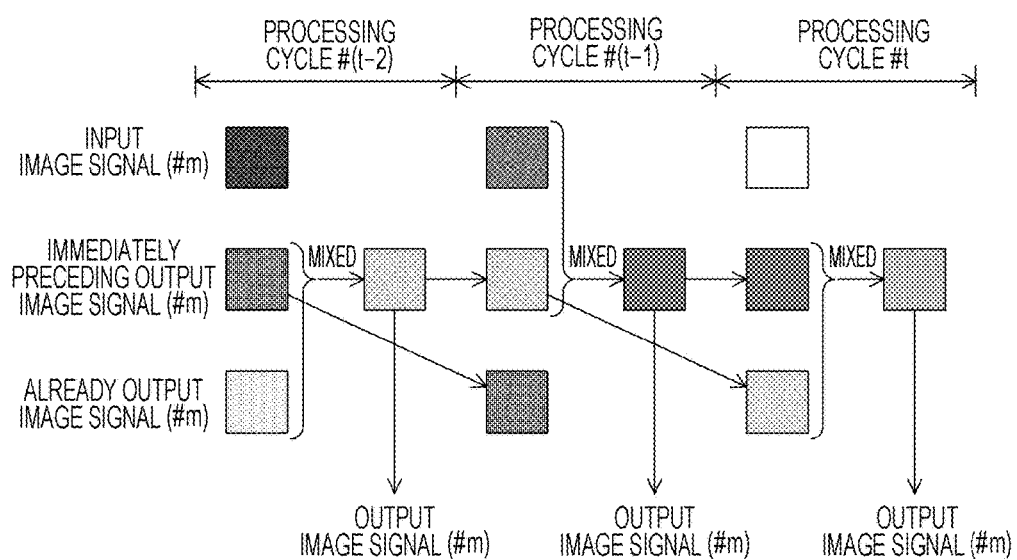
b

FIG. 10
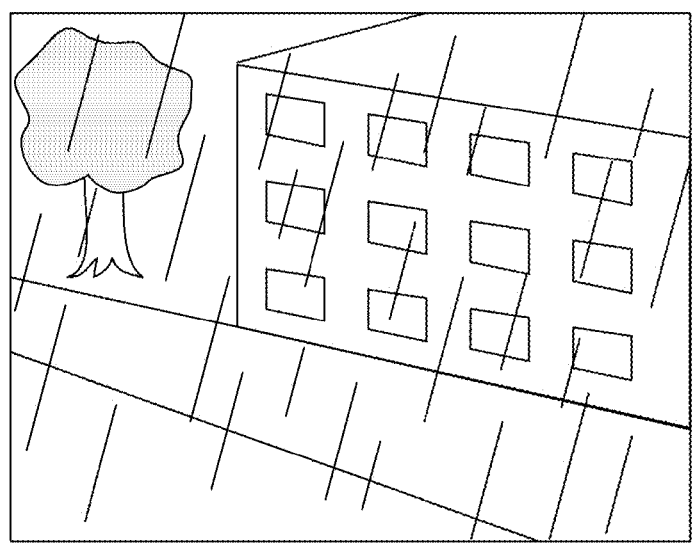
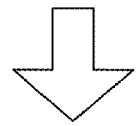
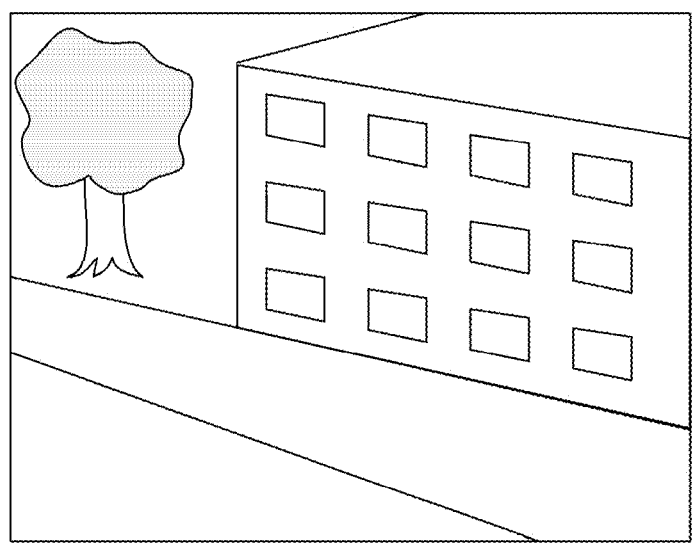

IMAGE PROCESSING APPARATUS, IMAGE PROCESSING SYSTEM, AND IMAGE PROCESSING METHOD

CROSS-REFERENCE TO RELATED APPLICATIONS

This application is a National Stage of International Application No. PCT/JP2016/050641, filed in the Japanese Patent Office as a Receiving office on Jan. 12, 2016, which claims priority to Japanese Patent Application Number 2015-057773, filed in the Japanese Patent Office on Mar. 20, 2015, each of which is hereby incorporated by reference in its entirety.

TECHNICAL FIELD

The present technology relates to an image processing apparatus, an image processing system, and an image processing method. In more detail, the present technology relates to an image processing apparatus, an image processing system, an image processing method, and a program for causing a computer to execute the method which remove the influence of rain or the like.

BACKGROUND ART

Monitoring apparatuses installed outdoors are mainly used for monitoring invasion of suspicious individuals, cars, and the like. As such a method of sensing suspicious individuals or the like, a method of calculating a difference from a background image is known. It is desirable that the background image used at this time be an image from which an image with a moving object has been removed. For example, at the time of rain, an image from which raindrops have been removed is used. Therefore, a system that performs image processing in order to remove rain, snow, and the like reflected in an image has been proposed (for example, refer to Patent Document 1).

CITATION LIST

Patent Document

Patent Document 1: Japanese Patent Application Laid-Open No. 2006-018658

SUMMARY OF THE INVENTION

Problems to be Solved by the Invention

In the above-described conventional technology, images of consecutive frames are held in an image memory and an average value thereof is calculated to decrease the influence of rain or the like. However, in order to calculate this average value, it is necessary to hold images of at least three frames, causing a problem that a large capacity image memory is required.

The present technology has been developed in view of such a situation and it is an object of the present technology to reduce an image memory in an image processing apparatus that generates a background image from which the influence of rain or the like is removed.

Solutions to Problems

The present technology has been made in order to solve the above-mentioned problems and a first aspect thereof is an image processing apparatus including a selection unit that selects two image signals having a shorter distance in a color space from among an input image signal input during a focused processing cycle among processing cycles executed for respective time-series frames each constituted by the input image signal, an immediately preceding output image signal which is an output image signal generated during a processing cycle immediately preceding the focused processing cycle, and an already output image signal which is an image signal based on the output image signal generated during a processing cycle preceding the focused processing cycle by two cycles, and an output image signal generation unit that generates the output image signal by mixing the two selected image signals on the basis of a predetermined mixing ratio. With this configuration, an action is achieved in which two image signals having a shorter distance in the color space are selected from among the input image signal, the immediately preceding output image signal, and the already output image signal to be mixed.

In addition, in this first aspect, the output image signal generation unit may perform the mixing on the basis of the mixing ratio of one to one. With this configuration, an action is achieved in which an average value of the two selected image signals is calculated.

In addition, in this first aspect, the output image signal generation unit may perform the mixing on the basis of the mixing ratio according to a ratio of saturation between the two image signals. With this configuration, an action is achieved in which a weighted average value obtained by weighting using the saturation of the two selected image signals is calculated.

In addition, in this first aspect, an already output image signal generation unit that mixes the output image signal generated during the focused processing cycle and the immediately preceding output image signal on the basis of a predetermined second mixing ratio to generate the already output image signal may be further included. With this configuration, an action is achieved in which the output image signal and the immediately preceding output image signal are mixed to generate the already output image signal.

In addition, in this first aspect, the already output image signal generation unit may perform the mixing on the basis of the second mixing ratio of one to one. With this configuration, an action is achieved in which an average value of the output image signal and the immediately preceding output image signal is calculated.

In addition, in this first aspect, the already output image signal generation unit may perform the mixing on the basis of the second mixing ratio according to a ratio of saturation between the output image signal generated during the focused processing cycle and the immediately preceding output image signal. With this configuration, an action is achieved in which a weighted average value obtained by weighting using the saturation of the output image signal and the immediately preceding output image signal is calculated.

In addition, in this first aspect, an immediately preceding output image signal holding unit that holds the immediately preceding output image signal and an already output image signal holding unit that holds the already output image signal may be further included. With this configuration, an action is achieved in which the immediately preceding output image signal and the already output image signal are individually held.

In addition, a second aspect of the present technology is an image processing system including an imaging apparatus that supplies an image signal as an input image signal, a selection unit that selects two image signals having a shorter distance in a color space from among the input image signal input during a focused processing cycle among processing cycles executed for respective time-series frames each constituted by the supplied input image signal, an immediately preceding output image signal which is an output image signal generated during a processing cycle immediately preceding the focused processing cycle, and an already output image signal which is an image signal based on the output image signal generated during a processing cycle preceding the focused processing cycle by two cycles, and an output image signal generation unit that generates the output image signal by mixing the two selected image signals on the basis of a predetermined mixing ratio. With this configuration, an action is achieved in which two image signals having a shorter distance in the color space are selected from among the input image signal, the immediately preceding output image signal, and the already output image signal to be mixed.

In addition, a third aspect of the present technology is an image processing method including a selection procedure of selecting two image signals having a shorter distance in a color space from among an input image signal input during a focused processing cycle among processing cycles executed for respective time-series frames each constituted by the input image signal, an immediately preceding output image signal which is an output image signal generated during a processing cycle immediately preceding the focused processing cycle, and an already output image signal which is an image signal based on the output image signal generated during a processing cycle preceding the focused processing cycle by two cycles, and an output image signal generation procedure of generating the output image signal by mixing the two selected image signals on the basis of a predetermined mixing ratio. With this configuration, an action is achieved in which two image signals having a shorter distance in the color space are selected from among the input image signal, the immediately preceding output image signal, and the already output image signal to be mixed.

Effects of the Invention

According to the present technology, an excellent effect of reducing an image memory can be exerted in an image processing apparatus that generates a background image from which the influence of rain or the like is removed. Note that the effects described herein are not necessarily limited and any effects described in the present disclosure may be applied.

BRIEF DESCRIPTION OF DRAWINGS

FIG. 2 is a diagram illustrating a configuration example of an image processing apparatus 200 according to a first embodiment of the present technology.

FIG. 3 is a diagram illustrating a configuration example of an immediately preceding output image signal holding unit 230 and an already output image signal holding unit 240 according to the first embodiment of the present technology.

FIG. 8 is a diagram for explaining image processing according to the first embodiment of the present technology.

FIG. 10 is a diagram illustrating an effect of the image processing according to the first embodiment of the present technology.

MODE FOR CARRYING OUT THE INVENTION

Modes for carrying out the present technology (hereinafter, referred to as embodiments) will be described below. The description will be given in the following order.

1. First Embodiment (an example in the case of generating an output image signal by calculating an average value of selected image signals)

2. Second Embodiment (an example in the case of generating an output image signal by mixing on the basis of a mixing ratio according to saturation of selected image signals).

3. Third Embodiment (an example in the case of generating an already output image signal from an output image signal and an immediately preceding image signal)

4. Fourth Embodiment (an example in the case of generating an already output image signal by mixing on the basis of a mixing ratio according to saturation of an output image signal and an immediately preceding image signal)

<1. First Embodiment>

[System Configuration]

Figure 1:
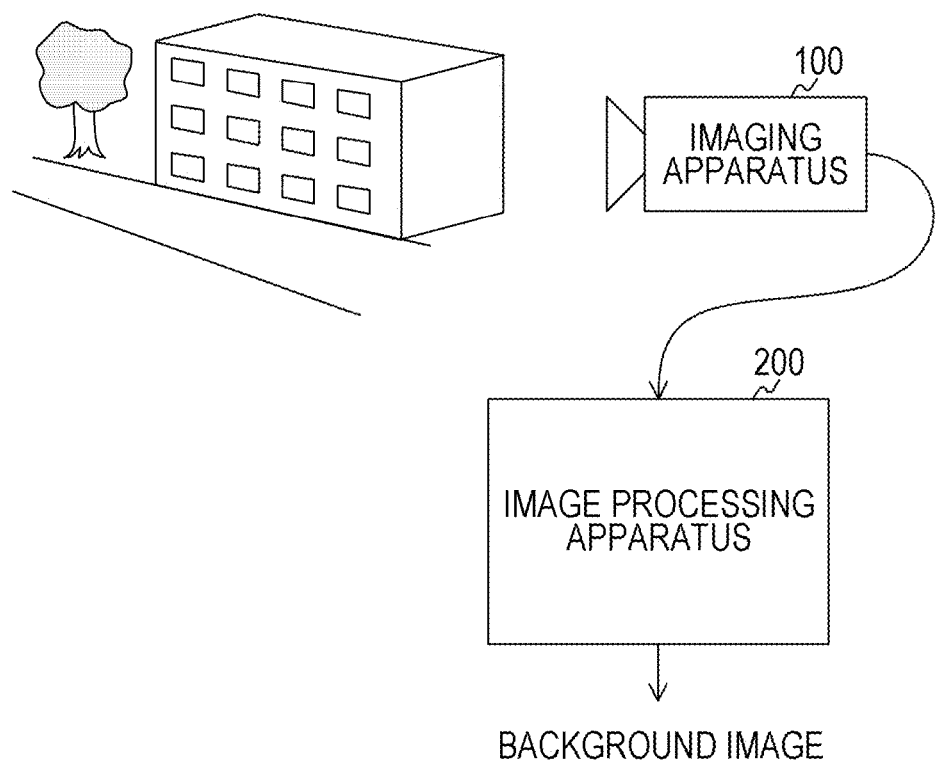
FIG. 1 is a diagram illustrating a configuration example of a system according to an embodiment of the present technology.

FIG. 1 is a diagram illustrating a configuration example of a system according to an embodiment of the present technology. An imaging apparatus 100 illustrated in FIG. 1 images a scene and so on and outputs an image signal. At this time, the imaging apparatus 100 generates the image signal for each frame to sequentially output. This frame has image signals equivalent to one screen and a moving image is constituted by time-series frames sequentially output. In addition, the imaging apparatus 100 is assumed to output an image signal made up of an image signal (R) corresponding to red light, an image signal (G) corresponding to green light, and an image signal (B) corresponding to blue light, as the image signal.

An image processing apparatus 200 is an apparatus that generates and outputs a background image from which an image with a moving object is removed from an input image signal input by the imaging apparatus 100. Note that the image processing apparatus 200 performs the above-mentioned image processing for each time-series frame output from the imaging apparatus 100. Here, this image processing repeatedly executed for each frame is referred to as a processing cycle. As will be described later, when the image processing is performed on a corresponding frame in a certain processing cycle, results of the image processing in preceding processing cycles are referred to. Therefore, when the processing by the image processing apparatus 200 is described, in order to pay attention to a certain processing cycle and to distinguish this processing cycle from the preceding processing cycles, this processing cycle is referred to as a focused processing cycle. Note that the imaging apparatus 100 and the image processing apparatus 200 constitute an image processing system.

[Configuration of Image Processing Apparatus]

FIG. 2 is a diagram illustrating a configuration example of the image processing apparatus 200 according to a first embodiment of the present technology. This image processing apparatus 200 includes a selection unit 210, an output image signal generation unit 220, an immediately preceding output image signal holding unit 230, and an already output image signal holding unit 240.

The selection unit 210 selects two image signals having a shorter distance in a color space from among the input image signal from the imaging apparatus 100, an immediately preceding output image signal held in the immediately preceding output image signal holding unit 230, and an already output image signal held in the already output image signal holding unit 240. Details of selection by the selection unit 210 will be described later.

The output image signal generation unit 220 generates an output image signal by mixing two image signals 201 selected by the selection unit 210. At this time, the output image signal generation unit 220 mixes these image signals on the basis of a predetermined mixing ratio. In the first embodiment of the present technology, this mixing is performed on the basis of a mixing ratio of one to one. Details of this mixing in the output image signal generation unit 220 will be described later.

The immediately preceding output image signal holding unit 230 holds an output image signal generated by the output image signal generation unit 220 during a processing cycle immediately preceding the focused processing cycle, as the immediately preceding output image signal. The configuration of the immediately preceding output image signal holding unit 230 will be described later.

The already output image signal holding unit 240 holds an image signal based on an output image signal generated during a processing cycle preceding the focused processing cycle by two cycles, as the already output image signal. In the already output image signal holding unit 240 according to the first embodiment of the present technology, an immediately preceding output image signal that was held in the immediately preceding output image signal holding unit 230 during a processing cycle immediately preceding a focused cycle is held as the already output image signal. As described above, in the first embodiment of the present technology, since the immediately preceding output image signal is an output image signal generated during an immediately preceding processing cycle, an output image signal generated during a processing cycle preceding the focused processing cycle by two cycles is held as the already output image signal. The configuration of the already output image signal holding unit 240 will be described later.

[Configuration of Immediately Preceding Output Image Signal Holding Unit and Already Output Image Signal Holding Unit]

FIG. 3 is a diagram illustrating a configuration example of the immediately preceding output image signal holding unit 230 and the already output image signal holding unit 240 according to the first embodiment of the present technology. In FIG. 3, "a" represents the configuration of the frame. A frame made up of 640 pixels×480 lines is cited as an example in "a" in FIG. 3. The imaging apparatus 100 outputs the image signals to the image processing apparatus 200 in the order of the numbers denoted in "a" in FIG. 3. For convenience, this number is treated as the address of the input image signal.

In FIG. 3, "b" represents the configuration of the immediately preceding output image signal holding unit 230. As illustrated therein, the immediately preceding output image signal holding unit 230 is constituted by an image memory having the same number of storage areas as the number of image signals of one frame. As described above, the immediately preceding output image signal holding unit 230 holds the output image signal generated by the output image signal generation unit 220 as the immediately preceding output image signal. At this time, the output image signal is held in a storage area at the same address as an input image signal corresponding to this output image signal.

In FIG. 3, "c" represents the configuration of the already output image signal holding unit 240. As in the immediately preceding output image signal holding unit 230, the already output image signal holding unit 240 is also constituted by an image memory having the same number of storage areas as the number of image signals of one frame. As described above, the already output image signal holding unit 240 holds the immediately preceding output image signal that was held in the immediately preceding output image signal holding unit 230, as the already output image signal. At this time, as in the immediately preceding output image signal holding unit 230, the immediately preceding output image signal is held in a storage area at the same address as an input image signal corresponding to the original output image signal.

[Selection Method in Selection Unit]

Figure 4:
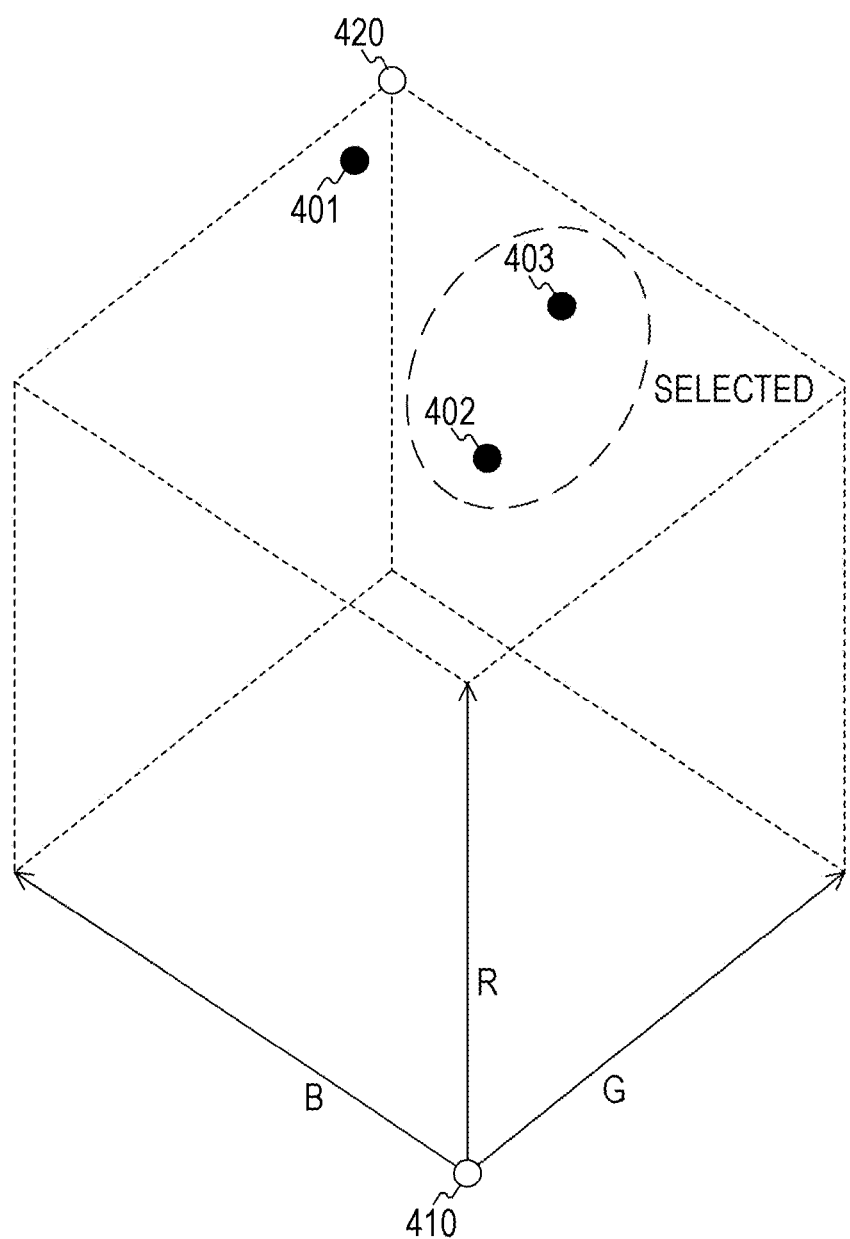
FIG. 4 is a diagram illustrating a selection method according to the first embodiment of the present technology.

FIG. 4 is a diagram illustrating a selection method according to the first embodiment of the present technology. FIG. 4 represents a selection method in the selection unit 210. In addition, FIG. 4 represents a color space in which respective signals of R, G, and B constituting an image signal are applied to coordinates. Point 410 in FIG. 4 is a point at which all of R, G, and B have a value "0" and matches an image signal corresponding to black. Point 420 is a point at which all of R, G, and B have maximum values, for example, a value "255" in eight-bit representation and matches an image signal corresponding to white. It is also assumed that points 401 to 403 individually represent the input image signal, the immediately preceding output image signal, and the already output image signal. As described above, the selection unit 210 selects two image signals having a shorter distance in the color space from among the three image signals, namely, the input image signal, the immediately preceding output image signal, and the already output image signal. Therefore, the selection unit 210 calculates respective distances in the color space between the three image signals.

This will be described by taking as an example the case of calculating a distance for points 402 and 403. Given that respective R, G, and B signals at points 402 and 403 are R1, G1, and B1 and R2, G2, and B2, respectively, a distance D therebetween can be calculated as indicated by the following formula.

$$D=\sqrt{(R1-R2)^2+(G1-G2)^2+(B1-B2)^2}$$ [Mathematical Formula 1]

The distances D are calculated and compared for the respective three image signals mentioned above and two image signals with a smallest D value are selected. As a result, it is possible to select two image signals having a shortest mutual distance in the color space from among the three image signals (points 401 to 403 in FIG. 4). Note that $D^2$ may be calculated instead of the distance D and used for comparison.

[Configuration of Selection Unit]

Figure 5:
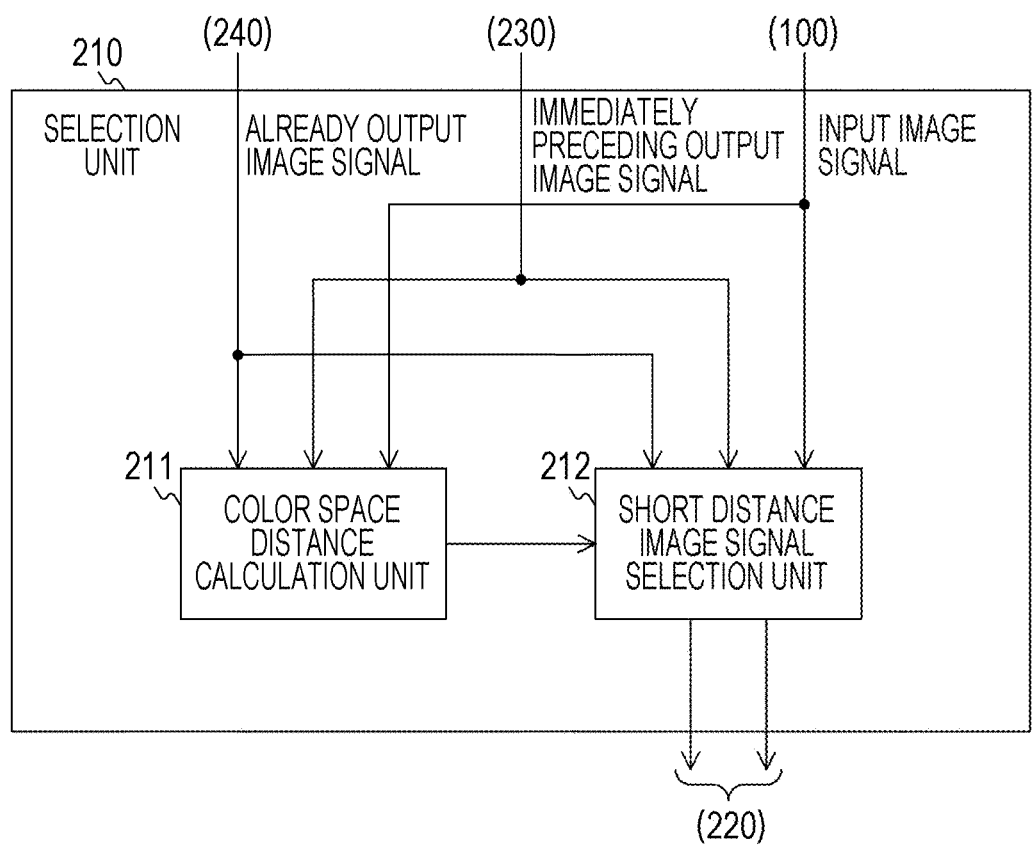
FIG. 5 is a diagram illustrating a configuration example of a selection unit 210 according to the first embodiment of the present technology.

FIG. 5 is a diagram illustrating a configuration example of the selection unit 210 according to the first embodiment of the present technology. The selection unit 210 includes a color space distance calculation unit 211 and a short distance image signal selection unit 212.

The color space distance calculation unit 211 calculates distances in the color space between the input image signal, the immediately preceding output image signal, and the already output image signal.

The short distance image signal selection unit 212 selects two image signals located at the shortest distance from among the input image signal, the immediately preceding output image signal, and the already output image signal on the basis of a calculation result of the color space distance calculation unit 211 to output. Note that, in a case where these three image signals are located at an equal distance, the immediately preceding output image signal and the already output image signal are selected and output.

[Mixing Method]

Figure 6:
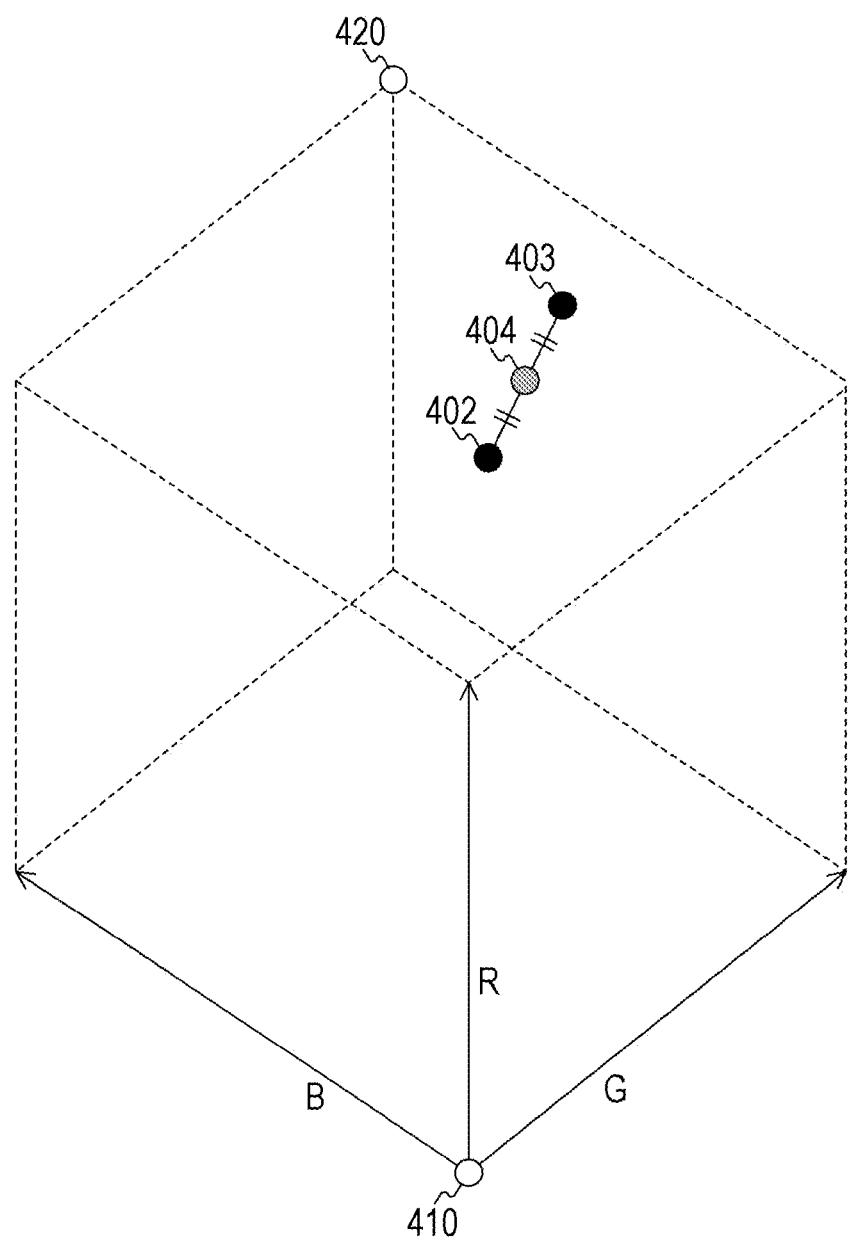
FIG. 6 is a diagram illustrating a mixing method according to the first embodiment of the present technology.

FIG. 6 is a diagram illustrating a mixing method according to the first embodiment of the present technology. FIG. 6 represents a case where image signals matching points 402 and 403 described with reference to FIG. 4 are mixed and an output image signal is generated. As described above, in the first embodiment of the present technology, mixing is performed on the basis of a mixing ratio of one to one. This mixing can be performed by calculating an average value of two image signals for each coordinate. That is, as illustrated in FIG. 6, this mixing can be performed by calculating an image signal at midpoint 404 in the color space between the two target image signals. The calculation of the image signal at midpoint 404 can be performed as indicated by the following formulas.

$$R'=(R1+R2)/2$$

$$B'=(B1+B2)/2$$

$$G'=(G1+G2)/2$$

However, R', G', and B' are R, G, and B signals at midpoint 404, respectively. With this calculation, the two image signals can be mixed on the basis of a ratio of one to one.

[Configuration of Output Image Signal Generation Unit]

Figure 7:
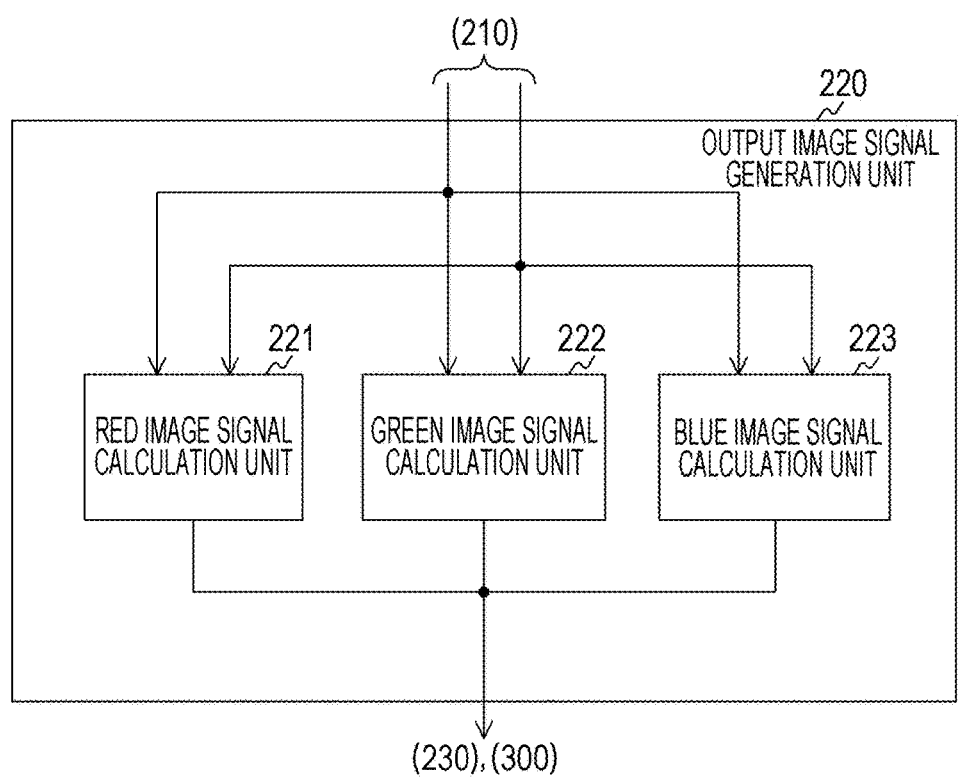
FIG. 7 is a diagram illustrating a configuration example of an output image signal generation unit 220 according to the first embodiment of the present technology.

FIG. 7 is a diagram illustrating a configuration example of the output image signal generation unit 220 according to the first embodiment of the present technology. This output image signal generation unit 220 includes a red image signal calculation unit 221, a green image signal calculation unit 222, and a blue image signal calculation unit 223.

The red image signal calculation unit 221 calculates an average value (R') of image signals corresponding to red light among the two image signals that have been input. The green image signal calculation unit 222 calculates an average value (G') of image signals corresponding to green light among the two image signals that have been input. The blue image signal calculation unit 223 calculates an average value (B') of image signals corresponding to blue light among the two image signals that have been input. An image signal made up of R', G', and B' calculated by these image signal calculation units is output from the output image signal generation unit 220 as the output image signal.

[Image Processing Method]

FIG. 8 is a diagram for explaining image processing according to the first embodiment of the present technology. In FIG. 8, "a" represents a relationship between a screen 430 and a pixel 431. A case is assumed in which an image signal #m corresponding to this pixel 431 is input to the image processing apparatus 200. Here, #m represents the address of image signal mentioned above. In FIG. 8, "b" represents processing in the image processing apparatus 200 in a case where the image signal #m is used as the input image signal. Note that a processing cycle #t in "b" in FIG. 8 matches the focused processing cycle.

First, two image signals having a shorter distance in the color space are selected by the selection unit 210 from among an input image signal #m, an immediately preceding output image signal #m, and an already output image signal #m. Note that the immediately preceding output image signal #m and the already output image signal #m are an immediately preceding output image signal and an already output image signal corresponding to the pixel 431, respectively. These output image signals are held in memory areas at an address #m in the immediately preceding output image signal holding unit 230 and the already output image signal holding unit 240, respectively. In the processing cycle #t illustrated in "b" in FIG. 8, the immediately preceding output image signal #m and the already output image signal #m are assumed as the selected image signals. Next, the output image signal generation unit 220 mixes these two image signals to generate an output image signal.

This output image signal is output from the image processing apparatus 200 and is also held in the memory area at the address #m in the immediately preceding output image signal holding unit 230. Similarly, the immediately preceding output image signal #m is held in the memory area at the address #m in the already output image signal holding unit 240. These output image signals will be used as the immediately preceding output image signal #m and the already output image signal #m during the next processing cycle of the focused processing cycle. Meanwhile, an output image signal generated during a processing cycle immediately preceding the focused processing cycle (processing cycle #(t-1)) matches the immediately preceding output image signal for the focused processing cycle held in the immediately preceding output image signal holding unit 230. Furthermore, an output image signal generated during a processing cycle preceding the focused processing cycle by two cycles (processing cycle #(t-2)) matches the already output image signal for the focused processing cycle held in the already output image signal holding unit 240. In this manner, an output image signal generated in a certain processing cycle is used as the immediately preceding output image signal and so on during the subsequent processing cycles. Note that, in addition to the example cited in "b" in FIG. 8, it is also possible to assume a case where the input image signal #m and the already output image signal #m are selected by the selection unit 210.

The image processing will be described by taking as an example a case where an image signal in which rain or the like is imaged is input and image signals before rain or the like are reflected therein are individually held in the immediately preceding output image signal holding unit 230 and the already output image signal holding unit 240. A water drop such as rain is usually white and the image signal #m corresponding to the water drop is close to point 420 in the color space described with reference to FIG. 4. In contrast to this, since the immediately preceding output image signal #m and the already output image signal #m are image signals before rain or the like is reflected therein, these image signals are located at positions away from the input image signal #m in the color space. Therefore, the selection unit 210 selects the immediately preceding output image signal #m and the already output image signal #m. Thereafter, these signals are mixed and output by the output image signal generation unit 220. In this manner, the image processing apparatus 200 removes the image signal in which rain or the like is reflected.

[Image Processing Procedures]

Figure 9:
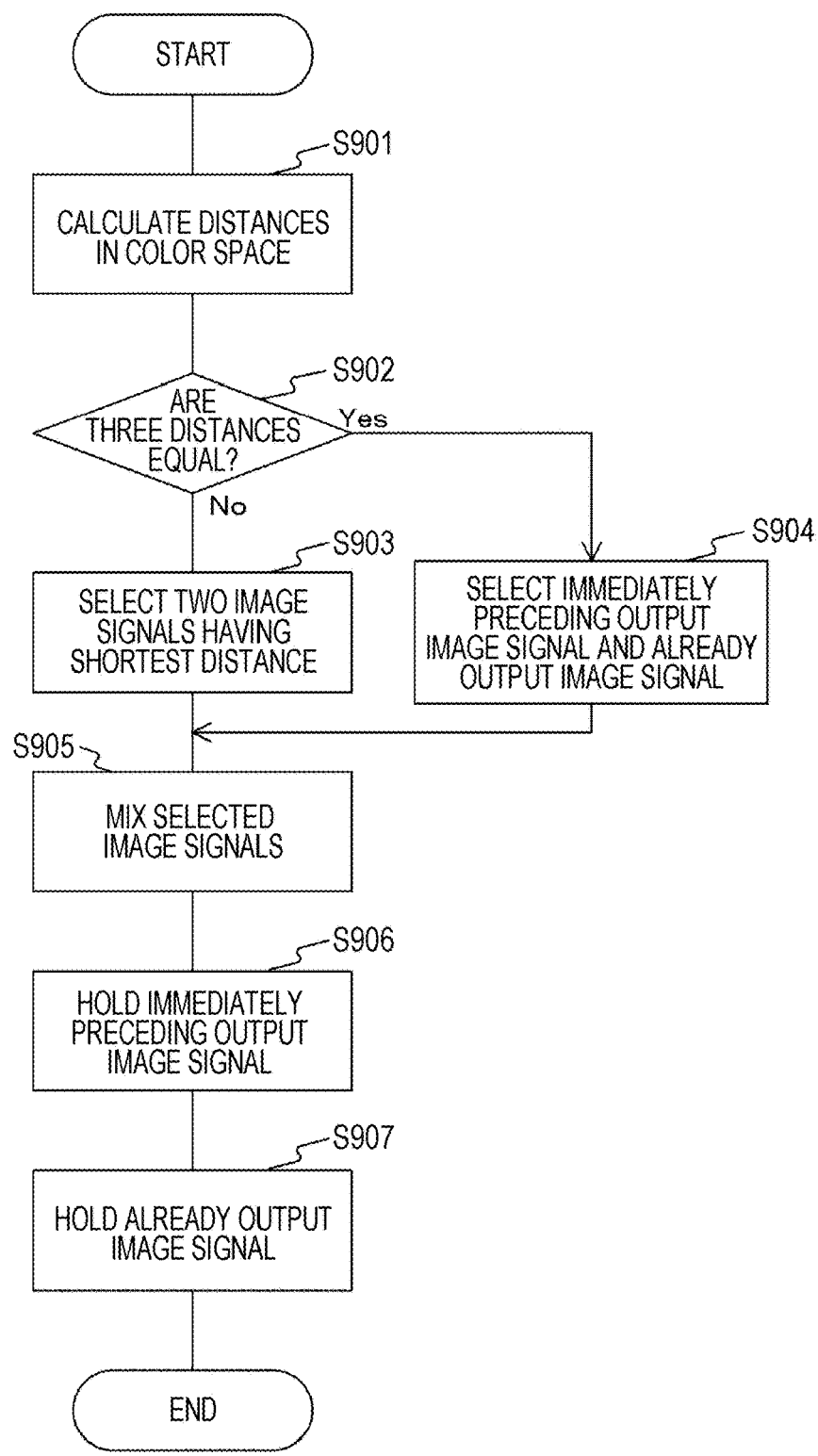
FIG. 9 is a diagram illustrating an example of image processing procedures according to the first embodiment of the present technology.

FIG. 9 is a diagram illustrating an example of image processing procedures according to the first embodiment of the present technology. The processing illustrated in FIG. 9 is started when an image signal is input to the image processing apparatus 200. First, distances in the color space between the input image signal, the immediately preceding output image signal, and the already output image signal are calculated by the selection unit 210 (step S901). Next, it is determined whether the calculated three distances are equal (step S902). In a case where the three distances are equal (step S902: Yes), the selection unit 210 selects the immediately preceding output image signal and the already output image signal (step S904). On the other hand, in a case where the calculated three distances are not equal (step S902: No), the selection unit 210 selects two image signals having the shortest distance (step S903).

Next, the output image signal generation unit 220 generates an output image signal by mixing the two selected image signals (step S905). Next, the generated output image signal is newly held in the immediately preceding output image signal holding unit 230 as the immediately preceding output image signal (step S906). Finally, the immediately preceding output image signal that has been held in the immediately preceding output image signal holding unit 230 is newly held in the already output image signal holding unit 240 as the already output image signal (step S907). Thereafter, the image processing apparatus 200 ends the processing.

[Effect of Image Processing]

FIG. 10 is a diagram illustrating an effect of the image processing according to the first embodiment of the present technology. FIG. 10 represents an example in a case where an image captured at the time of rain by the imaging apparatus 100 is processed by the image processing apparatus 200. As described with reference to FIG. 8, since an image signal in which raindrops are reflected is removed by the image processing apparatus 200, it is possible to obtain a background image from which rain has been removed.

As described above, according to the first embodiment of the present technology, a background image from which the influence of rain or the like has been removed can be generated by using an image memory for two frames in the immediately preceding output image signal holding unit and the already output image signal holding unit, as the image memory.

<2. Second Embodiment>

In the above embodiment, mixing has been performed on the basis of a mixing ratio of one to one when image signals are mixed. In contrast to this, in a second embodiment of the present technology, mixing is performed on the basis of a mixing ratio according to the ratio of saturation between the image signals. This can further improve the ability to remove the influence of rain or the like.

[Mixing Method in Output Image Signal Generation Unit]

Figure 11:
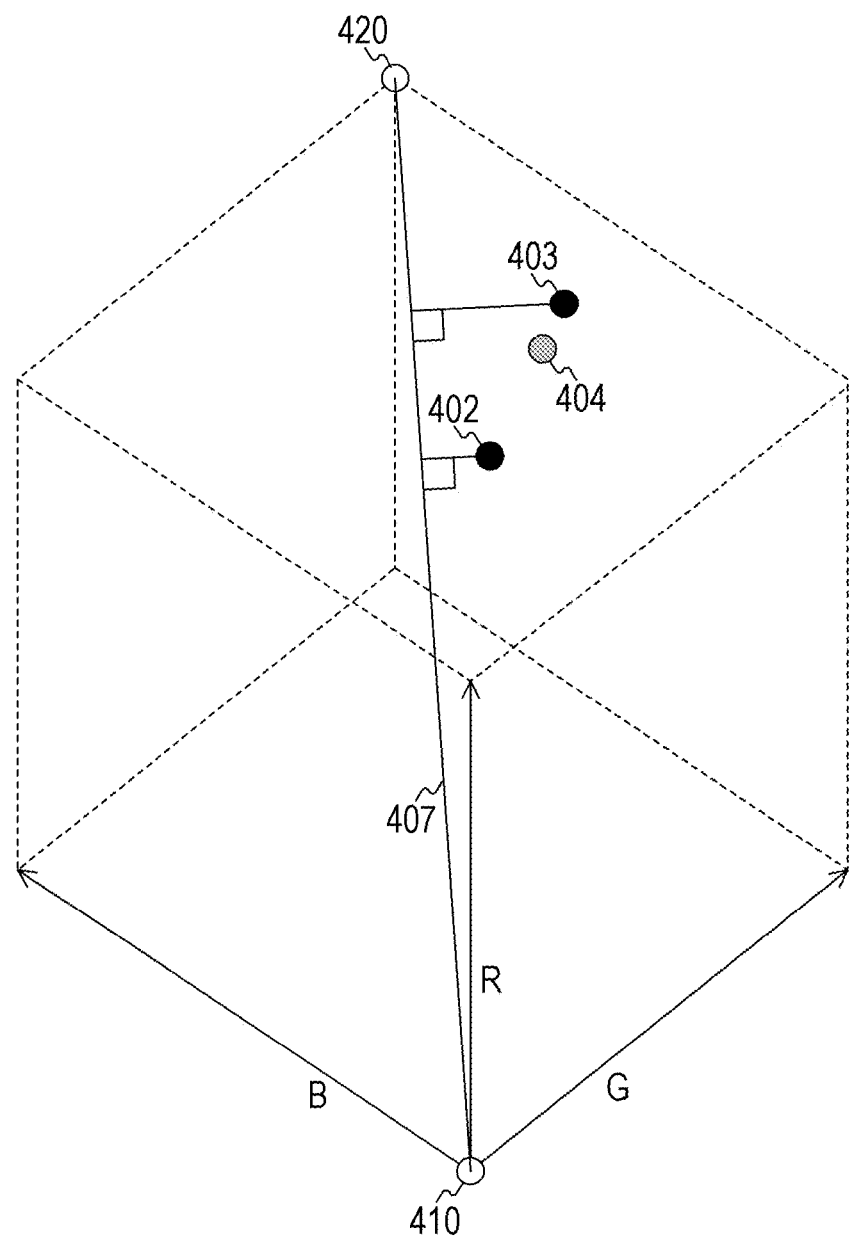
FIG. 11 is a diagram illustrating a mixing method according to a second embodiment of the present technology.

FIG. 11 is a diagram illustrating a mixing method according to the second embodiment of the present technology. FIG. 11 represents a case where mixing is performed on the basis of a mixing ratio according to the ratio of saturation between two image signals selected by a selection unit 210. In addition, FIG. 11 assumes a case where points 402 and 403 are selected by the selection unit 210 similarly to the case described with reference to FIG. 6. Usually, rain or the like has an achromatic color such as white. On the other hand, other images such as an image of a building often have chromatic colors. Therefore, at the time of mixing, mixing is performed at a mixing ratio according to the saturation of the image signals. Specifically, mixing is performed as follows. First, saturation at points 402 and 403 is calculated. This saturation is identical to distances from a straight line passing through points 410 and 420 to points 402 and 403. This distance C can be calculated as indicated by the following formula.

$$C = \sqrt{\left(\frac{2R-G-B}{3}\right)^2 + \left(\frac{-R+2G-B}{3}\right)^2 + \left(\frac{-R-G+2B}{3}\right)^2}$$ [Mathematical Formula 2]

This calculation is individually performed for points 402 and 403. Respective results of these calculations are assumed as C1 and C2. Next, a mixing ratio α is calculated. This calculation can be performed as follows.

$\alpha = C1/(C1+C2)$ (where $C1 > C2$)

$\alpha = C2/(C1+C2)$ (where $C1 < C2$)

$\alpha = 0.5$ (where $C1 = C2$)

Next, the image signals are mixed using this α. This mixing can be performed separately according to the following cases:

(a) In the case of C1>C2

$R' = \alpha \times R1 + (1-\alpha) \times R2$ $B' = \alpha \times B1 + (1-\alpha) \times B2$ $G' = \alpha \times G1 + (1-\alpha) \times G2$ (b) In the case of C1<C2

$R' = (1-\alpha) \times R1 + \alpha \times R2$ $B' = (1-\alpha) \times B1 + \alpha \times B2$ $G' = (1-\alpha) \times G1 + \alpha \times G2$ (C) In the case of C1=C2

The calculation can be performed in a similar manner to the calculation of the average value described with reference to FIG. 6.

Note that these arithmetic operations are equivalent to arithmetic operations for calculating a weighted average of the image signals at points 402 and 403 by weighting using the saturation of the respective image signals. With these calculations, the output image signal after mixing becomes an image signal with higher saturation than the case of the output image signal in the first embodiment of the present technology. This output image signal is held in the immediately preceding output image signal holding unit 230 as the immediately preceding output image signal to serve as an object of selection by the selection unit 210 for the next frame. Since this immediately preceding output image signal has higher saturation, a difference from the input image signal in which rain or the like close to an achromatic color is reflected is large. That is, the distance in the color space increases. For this reason, it is possible to improve the ability to remove the input image signal in which rain or the like is reflected.

[Configuration of Output Image Signal Generation Unit]

Figure 12:
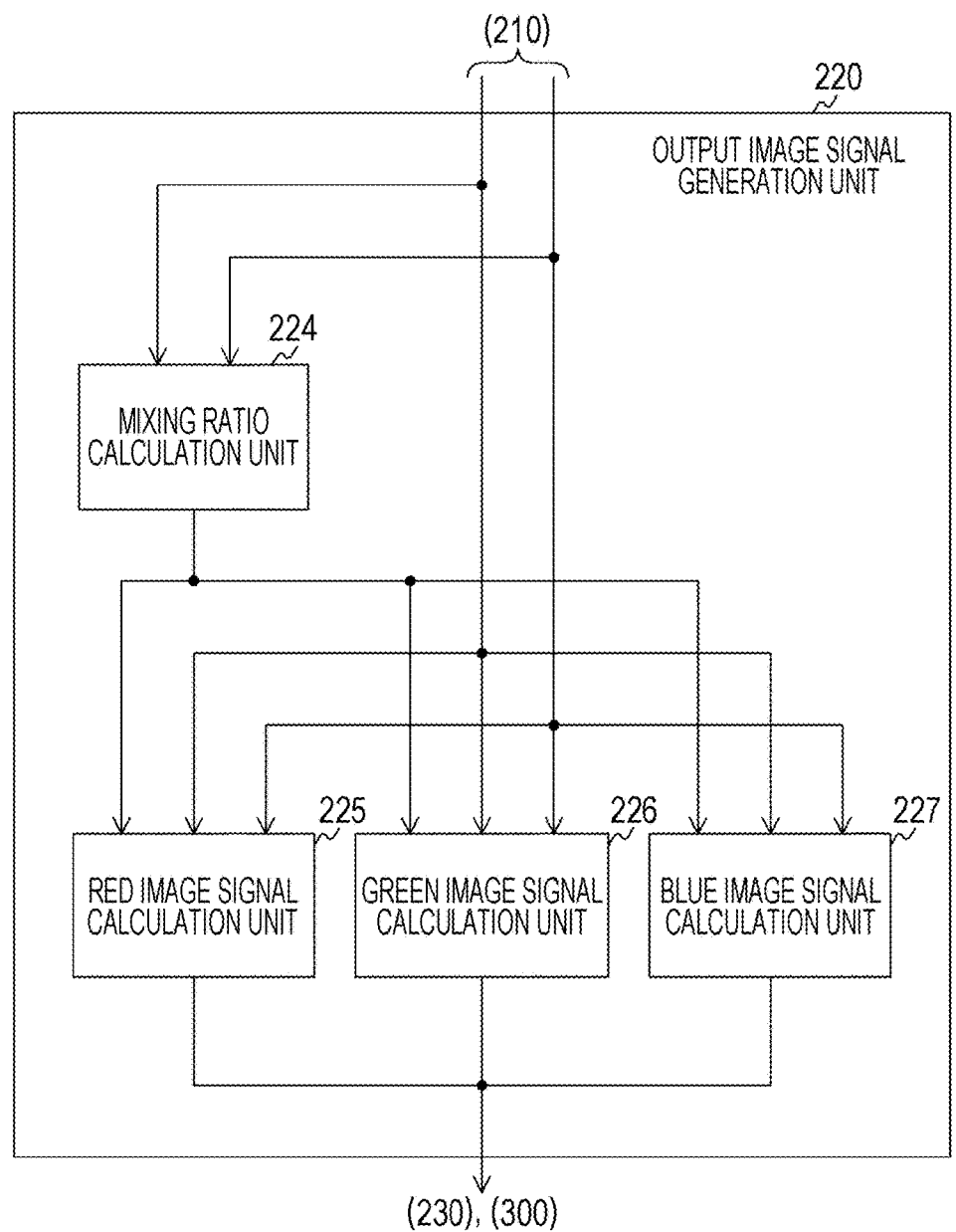
FIG. 12 is a diagram illustrating a configuration example of an output image signal generation unit 220 according to the second embodiment of the present technology.

FIG. 12 is a diagram illustrating a configuration example of an output image signal generation unit 220 according to the second embodiment of the present technology. The output image signal generation unit 220 generates the output image signal by performing the above-described mixing on the two image signals selected by the selection unit 210. In addition, this output image signal generation unit 220 includes a mixing ratio calculation unit 224, a red image signal calculation unit 225, a green image signal calculation unit 226, and a blue image signal calculation unit 227.

The mixing ratio calculation unit 224 calculates the mixing ratio ($\alpha$ described above) used when the image signals selected by the selection unit 210 are mixed.

The red image signal calculation unit 225 mixes image signals corresponding to red light among the two image signals that have been input, on the basis of the mixing ratio ($\alpha$) calculated by the mixing ratio calculation unit 224, to calculate a new image signal (R') corresponding to red light. The green image signal calculation unit 226 mixes image signals corresponding to green light among the two image signals that have been input, on the basis of $\alpha$ to calculate a new image signal (G') corresponding to green light. The blue image signal calculation unit 227 mixes image signals corresponding to blue light among the two image signals that have been input, on the basis of $\alpha$ to calculate a new image signal (B') corresponding to blue light. An image signal made up of R', G', and B' calculated by these image signal calculation units is output from the output image signal generation unit 220 as the output image signal.

Since the configuration of the image processing apparatus 200 other than the above-described configuration is similar to that of the image processing apparatus 200 described with reference to FIG. 2, a description thereof will be omitted.

As described above, according to the second embodiment of the present technology, an output image signal with higher saturation can be obtained and the ability to remove the influence of rain or the like can be improved.

<3. Third Embodiment>

In the above embodiment, the immediately preceding output image signal that was held in the immediately preceding output image signal holding unit 230 during a processing cycle immediately preceding the focused cycle has been used as the already output image signal. In contrast to this, in a third embodiment of the present technology, the already output image signal is generated by mixing this immediately preceding output image signal and the output image signal. This can further improve the ability to remove the influence of rain or the like.

[Configuration of Image Processing Apparatus]

Figure 13:
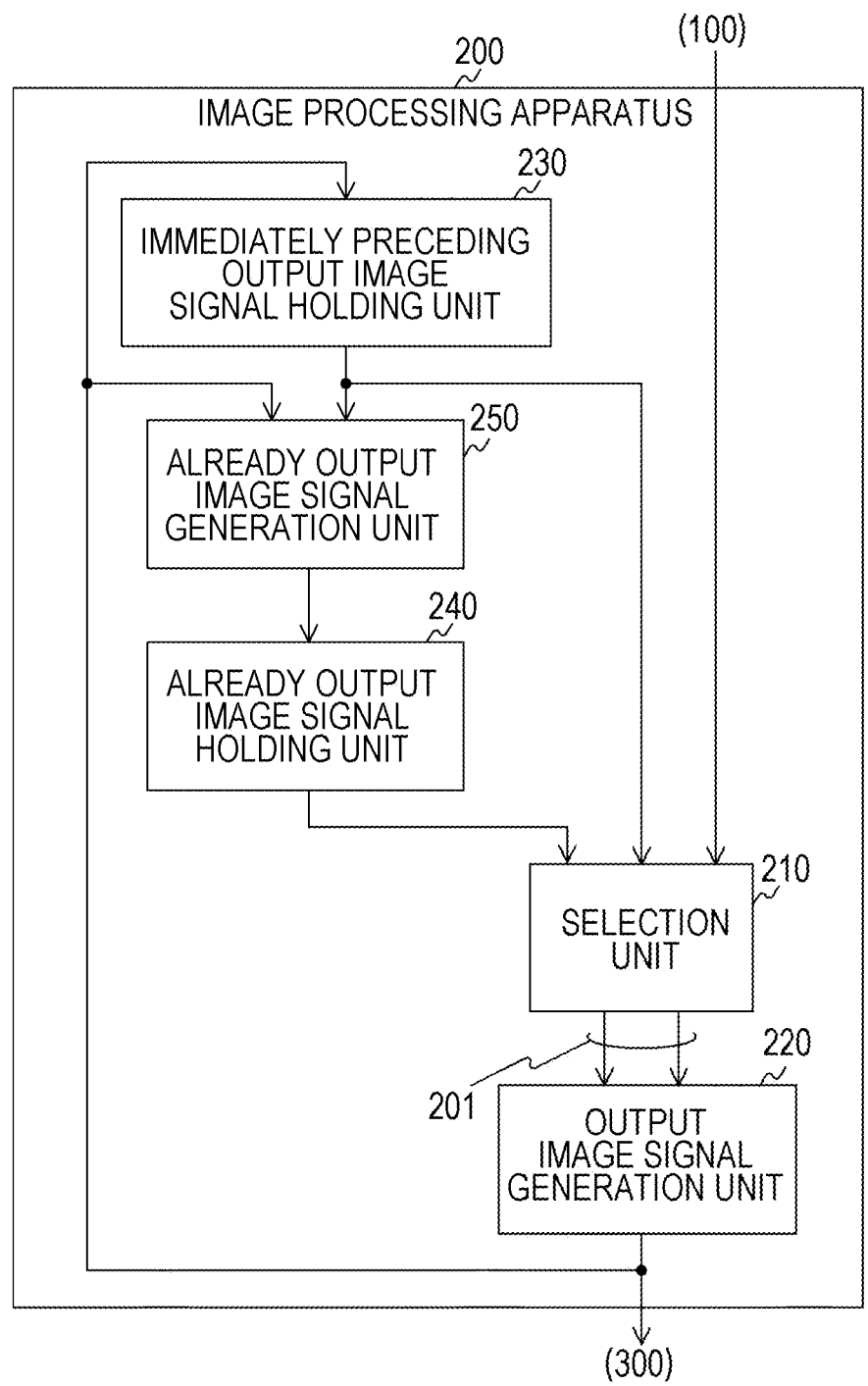
FIG. 13 is a diagram illustrating a configuration example of an image processing apparatus 200 according to a third embodiment of the present technology.

FIG. 13 is a diagram illustrating a configuration example of an image processing apparatus 200 according to the third embodiment of the present technology. The image processing apparatus 200 in FIG. 13 is different from the image processing apparatus 200 described with reference to FIG. 2 in that it further includes an already output image signal generation unit 250.

The already output image signal generation unit 250 generates the already output image signal. This already output image signal generation unit 250 mixes the immediately preceding output image signal held in an immediately preceding output image signal holding unit 230 and the output image signal generated by an output image signal generation unit 220 on the basis of a predetermined mixing ratio to generate an already output image signal. In the third embodiment of the present technology, this mixing is performed on the basis of a mixing ratio of one to one. The generated already output image signal is held in an already output image signal holding unit 240. Since the configuration of the image processing apparatus 200 other than the above-described configuration is similar to that of the image processing apparatus 200 described with reference to FIG. 2, a description thereof will be omitted.

[Image Processing Method]

Figure 14:
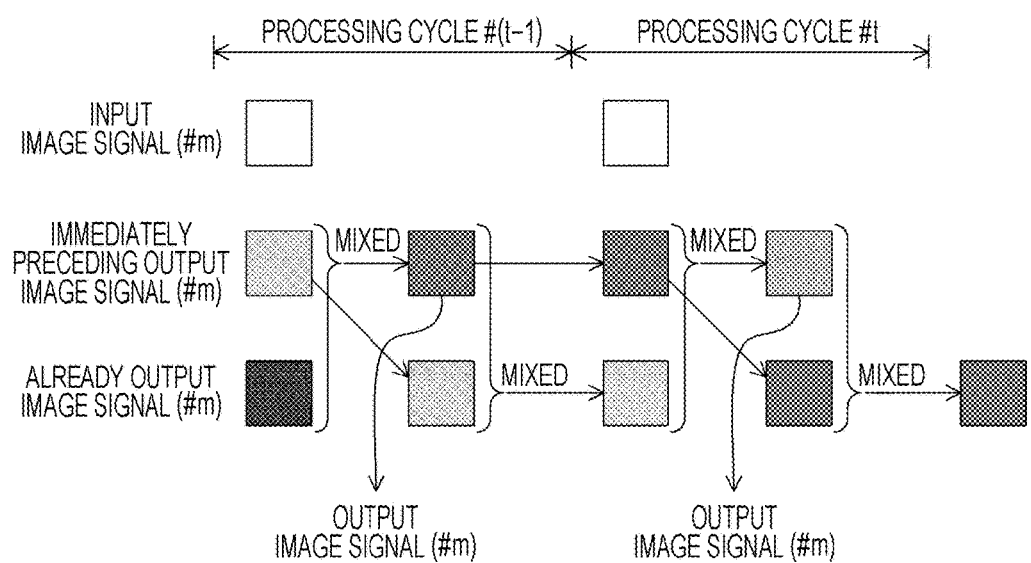
FIG. 14 is a diagram for explaining image processing according to the third embodiment of the present technology.

FIG. 14 is a diagram for explaining image processing according to the third embodiment of the present technology. The output image signal #m and the immediately preceding output image signal #m in the focused processing cycle (processing cycle #t) are mixed to generate a new already output image signal and the generated already output image signal is held in a memory area at the address #m in the already output image signal holding unit 240. As a method for this mixing, the mixing method described with reference to FIG. 6 can be used. That is, it is possible to use a method of calculating an average value of the output image signal and the immediately preceding output image signal to generate a new already output image signal. As a result, as compared with the image processing method described with reference to FIG. 8, a distance in the color space between the already output image signal and the immediately preceding output image signal is made short. Therefore, in the next processing cycle, the probability that the already output image signal and the immediately preceding output image signal are selected by the selection unit 210 is increased and the ability to remove the input image signal in which rain or the like is reflected is improved.

[Already Output Image Signal Generation Unit]

Figure 15:
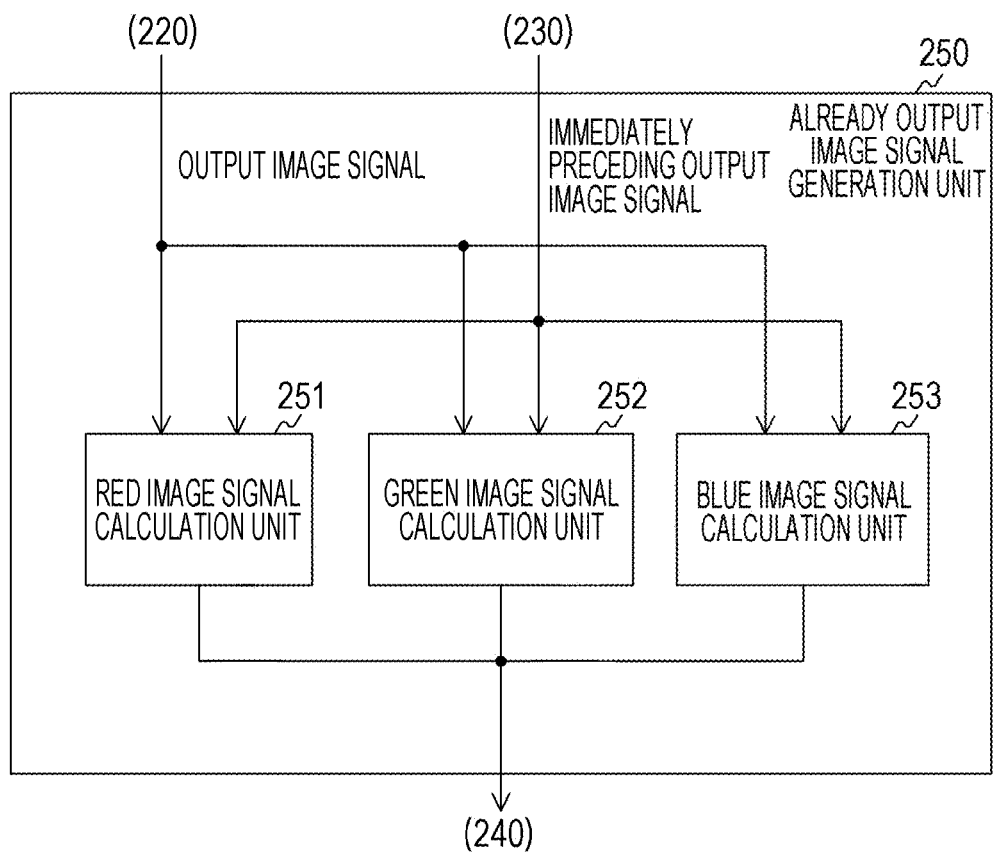
FIG. 15 is a diagram illustrating a configuration example of an already output image signal generation unit 250 according to the third embodiment of the present technology.

FIG. 15 is a diagram illustrating a configuration example of an already output image signal generation unit 250 according to the third embodiment of the present technology. This already output image signal generation unit 250 includes a red image signal calculation unit 251, a green image signal calculation unit 252, and a blue image signal calculation unit 253.

Since the red image signal calculation unit 251, the green image signal calculation unit 252, and the blue image signal calculation unit 253 are similar to the red image signal calculation unit 221, the green image signal calculation unit 222, and the blue image signal calculation unit 223 described with reference to FIG. 7, respectively, a description thereof is omitted. An image signal calculated by these image signal calculation units is output from the already output image signal generation unit 250 as the already output image signal.

As described above, according to the third embodiment of the present technology, the already output image signal having an image signal close to the output image signal and the immediately preceding output image signal can be generated and the ability to remove the influence of rain or the like can be further improved.

<4. Fourth Embodiment>

In the above third embodiment, mixing has been performed on the basis of a mixing ratio of one to one when the already output image signal is generated. In contrast to this, in a fourth embodiment of the present technology, mixing is performed on the basis of a mixing ratio according to the ratio of saturation between the image signals. This can further improve the ability to remove the influence of rain or the like.

[Already Output Image Signal Generation Unit]

Figure 16:
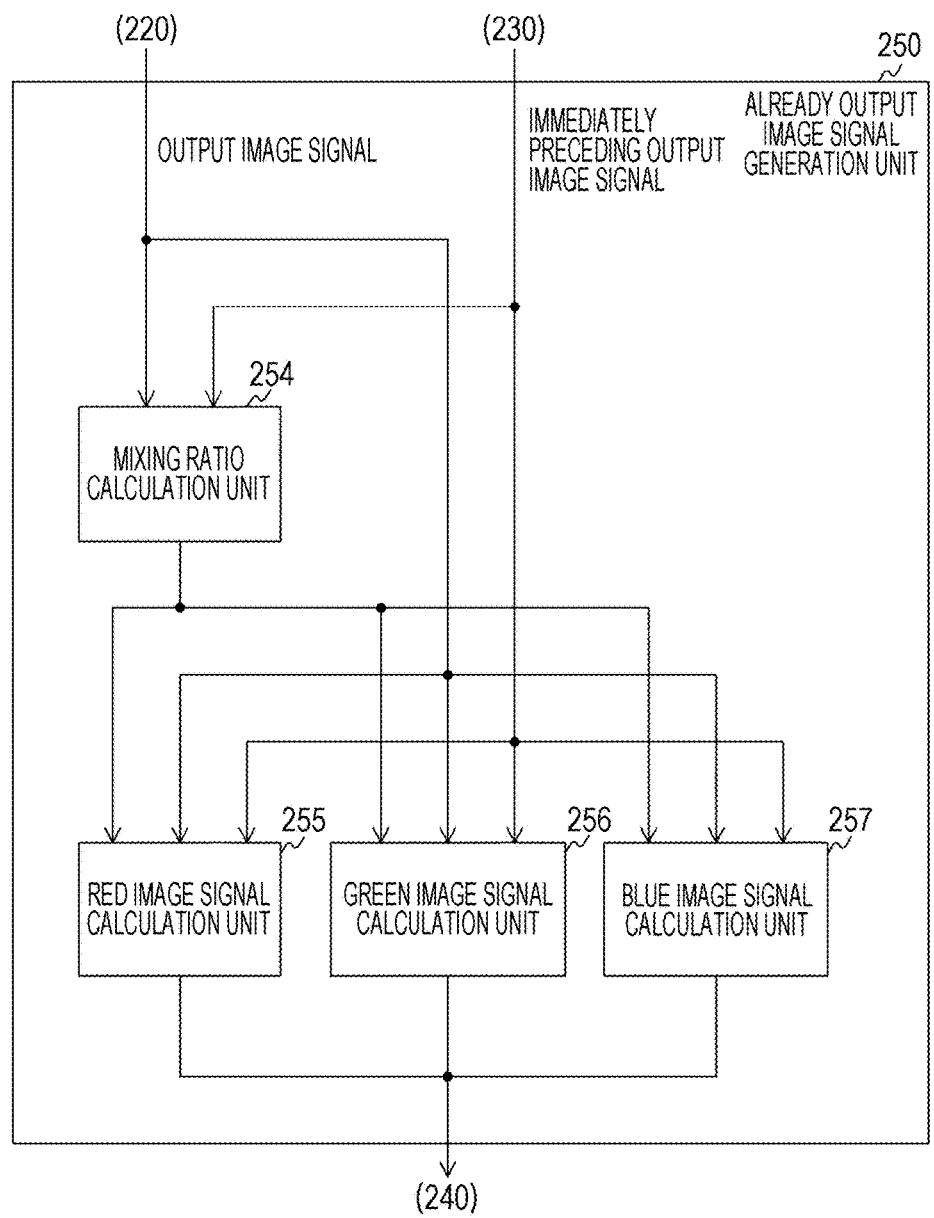
FIG. 16 is a diagram illustrating a configuration example of an already output image signal generation unit 250 according to a fourth embodiment of the present technology.

FIG. 16 is a diagram illustrating a configuration example of an already output image signal generation unit 250 according to the fourth embodiment of the present technology. This already output image signal generation unit 250 generates an already output image signal by mixing the immediately preceding output image signal held in an immediately preceding output image signal holding unit 230 and the output image signal generated by an output image signal generation unit 220. At this time, mixing is performed on the basis of the mixing ratio according to the ratio of saturation between these two image signals. In addition, this already output image signal generation unit 250 includes a mixing ratio calculation unit 254, a red image signal calculation unit 255, a green image signal calculation unit 256, and a blue image signal calculation unit 257.

The mixing ratio calculation unit 254 calculates the mixing ratio used when the output image signal and the immediately preceding output image signal are mixed. Since the configuration of the mixing ratio calculation unit 254 is similar to that of the mixing ratio calculation unit 224 described with reference to FIG. 12, a description thereof will be omitted.

Since the red image signal calculation unit 255, the green image signal calculation unit 256, and the blue image signal calculation unit 257 are similar to the red image signal calculation unit 225, the green image signal calculation unit 226, and the blue image signal calculation unit 227 described with reference to FIG. 12, respectively, a description thereof is omitted. An image signal calculated by these image signal calculation units is output from the already output image signal generation unit 250 as the already output image signal.

Since the configuration of an image processing apparatus 200 other than the above-described configuration is similar to that of the image processing apparatus 200 described with reference to FIG. 13, a description thereof will be omitted.

As described above, according to the fourth embodiment of the present technology, an already output image signal with high saturation can be generated and the ability to remove the influence of rain or the like can be further improved.

As described above, according to the embodiments of the present technology, an image memory for two frames in the immediately preceding output image signal holding unit 230 and the already output image signal holding unit 240 can be used as an image memory required in the image processing apparatus that generates a background image from which the influence of rain or the like is removed. The image memory can be reduced, while the image processing apparatus can be reduced in size and lowered in price.

Note that the above-described embodiments illustrate examples for embodying the present technology and matters in the embodiments and invention specifying matters in the claims individually have correspondence relationships. Likewise, the invention specifying matters in the claims and the matters in the embodiments of the present technology denoted by the same names as those in the claims individually have correspondence relationships. However, the present technology is not limited to the embodiments and can be embodied by subjecting the embodiments to various modifications without departing from the gist thereof.

In addition, the processing procedures described in the above embodiments may be regarded as a method having these series of procedures and additionally, may be regarded as a program for causing a computer to execute these series of procedures or as a recording medium storing the program. As this recording medium, for example, a compact disc (CD), a mini disc (MD), a digital versatile disc (DVD), a memory card, or a Blu-Ray® disc can be used.

Note that the effects described in the present specification merely serve as examples and not construed to be limited. There may be another effect as well.

Note that the present technology can be also configured as described below.

(1) An image processing apparatus including:

a selection unit that selects two image signals having a shorter distance in a color space from among an input image signal input during a focused processing cycle among processing cycles executed for respective time-series frames each constituted by the input image signal, an immediately preceding output image signal which is an output image signal generated during a processing cycle immediately preceding the focused processing cycle, and an already output image signal which is an image signal based on the output image signal generated during a processing cycle preceding the focused processing cycle by two cycles; and an output image signal generation unit that generates the output image signal by mixing the two selected image signals on the basis of a predetermined mixing ratio.

(2) The image processing apparatus according to the aforementioned (1), in which the output image signal generation unit performs the mixing on the basis of the mixing ratio of one to one.

(3) The image processing apparatus according to the aforementioned (1), in which the output image signal generation unit performs the mixing on the basis of the mixing ratio according to a ratio of saturation between the two image signals.

(4) The image processing apparatus according to any one of the aforementioned (1) to (3), further including an already output image signal generation unit that mixes the output image signal generated during the focused processing cycle and the immediately preceding output image signal on the basis of a predetermined second mixing ratio to generate the already output image signal.

(5) The image processing apparatus according to the aforementioned (4), in which the already output image signal generation unit performs the mixing on the basis of the second mixing ratio of one to one.

(6) The image processing apparatus according to the aforementioned (4), in which the already output image signal generation unit performs the mixing on the basis of the second mixing ratio according to a ratio of saturation between the output image signal generated during the focused processing cycle and the immediately preceding output image signal.

(7) The image processing apparatus according to any one of the aforementioned (1) to (6), further including:
an immediately preceding output image signal holding unit that holds the immediately preceding output image signal; and
an already output image signal holding unit that holds the already output image signal.

(8) An image processing system including:
an imaging apparatus that supplies an image signal as an input image signal;
a selection unit that selects two image signals having a shorter distance in a color space from among the input image signal input during a focused processing cycle among processing cycles executed for respective time-series frames each constituted by the supplied input image signal, an immediately preceding output image signal which is an output image signal generated during a processing cycle immediately preceding the focused processing cycle, and an already output image signal which is an image signal based on the output image signal generated during a processing cycle preceding the focused processing cycle by two cycles; and
an output image signal generation unit that generates the output image signal by mixing the two selected image signals on the basis of a predetermined mixing ratio.

(9) An image processing method including:
a selection procedure of selecting two image signals having a shorter distance in a color space from among an input image signal input during a focused processing cycle among processing cycles executed for respective time-series frames each constituted by the input image signal, an immediately preceding output image signal which is an output image signal generated during a processing cycle immediately preceding the focused processing cycle, and an already output image signal which is an image signal based on the output image signal generated during a processing cycle preceding the focused processing cycle by two cycles; and
an output image signal generation procedure of generating the output image signal by mixing the two selected image signals on the basis of a predetermined mixing ratio.

REFERENCE SIGNS LIST

100 Imaging apparatus
200 Image processing apparatus
210 Selection unit
211 Color space distance calculation unit
212 Short distance image signal selection unit
220 Output image signal generation unit
221, 225, 251, 255 Red image signal calculation unit
222, 226, 252, 256 Green image signal calculation unit
223, 227, 253, 257 Blue image signal calculation unit
224, 254 Mixing ratio calculation unit
230 Immediately preceding output image signal holding unit
240 Already output image signal holding unit
250 Already output image signal generation unit

The invention claimed is:

1. An image processing apparatus comprising:
a selection unit that selects two image signals having a shorter distance in a color space from among three image signals including an input image signal input during a focused processing cycle among processing cycles executed for respective time-series frames each constituted by the input image signal, an immediately preceding output image signal which is an output image signal generated during a processing cycle immediately preceding the focused processing cycle, and an already output image signal which is an image signal based on the output image signal generated during a processing cycle preceding the focused processing cycle by two cycles; and
an output image signal generation unit that generates the output image signal by mixing the two selected image signals on the basis of a predetermined mixing ratio.

2. The image processing apparatus according to claim 1, wherein the output image signal generation unit performs the mixing on the basis of the mixing ratio of one to one.

3. The image processing apparatus according to claim 1, wherein the output image signal generation unit performs the mixing on the basis of the mixing ratio according to a ratio of saturation between the two image signals.

4. The image processing apparatus according to claim 1, further comprising an already output image signal generation unit that mixes the output image signal generated during the focused processing cycle and the immediately preceding output image signal on the basis of a predetermined second mixing ratio to generate the already output image signal.

5. The image processing apparatus according to claim 4, wherein the already output image signal generation unit performs the mixing on the basis of the second mixing ratio of one to one.

6. The image processing apparatus according to claim 4, wherein the already output image signal generation unit performs the mixing on the basis of the second mixing ratio according to a ratio of saturation between the output image signal generated during the focused processing cycle and the immediately preceding output image signal.

7. The image processing apparatus according to claim 1, further comprising:
an immediately preceding output image signal holding unit that holds the immediately preceding output image signal; and
an already output image signal holding unit that holds the already output image signal.

8. An image processing system comprising:
an imaging apparatus that supplies an image signal as an input image signal;
a selection unit that selects two image signals having a shorter distance in a color space from among three image signals including the input image signal input during a focused processing cycle among processing cycles executed for respective time-series frames each constituted by the supplied input image signal, an immediately preceding output image signal which is an output image signal generated during a processing cycle immediately preceding the focused processing cycle, and an already output image signal which is an image signal based on the output image signal generated during a processing cycle preceding the focused processing cycle by two cycles; and
an output image signal generation unit that generates the output image signal by mixing the two selected image signals on the basis of a predetermined mixing ratio.

9. An image processing method comprising:
a selection procedure of selecting two image signals having a shorter distance in a color space from among three image signals including an input image signal input during a focused processing cycle among processing cycles executed for respective time-series frames each constituted by the input image signal, an immediately preceding output image signal which is an output image signal generated during a processing cycle immediately preceding the focused processing cycle, and an already output image signal which is an image signal based on the output image signal generated during a processing cycle preceding the focused processing cycle by two cycles; and an output image signal generation procedure of generating the output image signal by mixing the two selected image signals on the basis of a predetermined mixing ratio.

* * * * *